United States Patent Office 3,079,431
Patented Feb. 26, 1963

3,079,431
SYNTHESIS OF POLYMERIC BIS(PERFLUORO-ALKYL)PHOSPHINIC NITRIDES
Giorgio Tesi and Catherine M. Douglas, Riverside, Calif., assignors to the United States of America as represented by the Secretary of the Navy
No Drawing. Filed July 6, 1961, Ser. No. 122,369
3 Claims. (Cl. 260—551)
(Granted under Title 35, U.S. Code (1952), sec. 266)

The invention herein described may be manufactured and used by or for the Government of the United States of America for governmental purposes without the payment of any royalties thereon or therefor.

The present invention relates to the preparation of polymeric materials and more particularly to the polymeric materials having a backbone of alternated atoms of phosphorus in the pentavalent state and nitrogen, and having perfluoroalkyl groups as substitutes on the phosphorus.

Materials produced by the synthesis of the present invention possess remarkable resistance toward oxidation and thermal decomposition, and have uses in any system where these properties are desired.

A compound, polymeric bis(perfluoromethyl)phosphinic nitride, has been obtained through decomposition of the corresponding azide, $(CF_3)_2PN_3$, as described in copending patent application Serial No. 97,700, filed March 22, 1961, for Bisperfluoromethylphosphinic Nitride. However, due to the exposive character of the intermediate azide in the previous method, due care must be taken in preparing the compound by that process. The synthesis of the present invention overcomes the disadvantage of the previous method, and different and new compounds are obtainable thereby.

It is an object of the invention to provide a new and improved synthesis for the preparation of compounds having the molecular structure $(R_F)_2PN$ where R=any perfluoroalkyl groups.

It is another object of the invention to provide a completely safe technique for synthesizing polymeric bis(perfluoromethyl)phosphinic nitride.

It is still another object of the invention to provide a synthesis for the preparation of polymeric materials having a backbone of alternated atoms of phosphorus in the pentavalent state and nitrogen, and having perfluoroalkyl groups as substitutes on the phosphorus.

It is a further object of the invention to provide the synthesis of polymeric bis(perfluoroalkyl)phosphinic nitrides, wherein the yield is quantitative and the compound high in purity.

Other objects and many of the attendant advantages of this invention will become readily appreciated as the same becomes better understood by reference to the following detailed description:

In the synthesis of the present invention, chlorination of bis(perfluoroalkyl)phosphinous amides, $(R_F)_2PNH_2$, leads to the formation of bis(perfluoroalkyl) dischlorophosphinic amides, $(R_F)_2P(Cl_2)NH_2$, which in turn can be dehydrohalogenated by use of a tertiary amine, such as trimethylamine, thus forming bis(perfluoroalkylphosphinic nitrides, as shown by the following reactions:

$(R_F)_2PNH_2 + Cl_2 \rightarrow (R_F)_2P(Cl_2)NH_2$
$(R_F)_2P(Cl_2)NH_2 + 2NR_3 \rightarrow [(R_F)_2PN]_n + 2NR_3 \cdot HCl$ where $R_F$=perfluoroalkyl groups, and $NR_3$ may be trimethylamine.

This technique is completely safe, the yield is quantitative and the resulting compound can be obtained in high purity by solvent extraction of the tertiary amine hydrochloride from the mixture. This can be accomplished very easily because of the insolubility of the polymer.

An example of the foregoing synthesis is given as follows: Ten grams of bis(trifluoromethyl)phosphinous amide, $(CF_3)_2PNH_2$, was transferred in an air-free system to a three-neck flask fitted with stirrer, Dewar condenser and inlet for gas. About 50 ml. of $CHCl_3$ was then introduced as a solvent and the flask cooled at $-30°$ C. with a Dry-Ice/acetone bath. The stoichiometric amount of chlorine was introduced through the gas inlet keeping the solution in the flask under vigorous stirring. A smooth reaction took place and the whole amount of $Cl_2$ was used. After the addition was completed, the mixture was slowly treated with two equivalents of the tertiary amine, trimethylamine. A white precipitate was immediately formed. The mixture was then allowed to warm up to room temperature. The volatile materials were then removed under reduced pressure and the white solid material left was thoroughly extracted with $CHCl_3$ in a Soxhlet extractor to remove the trimethylamine hydrochloride present. The white powder left was dried under vacuum. A high yield (about 60%) of a compound corresponding to the composition $[(CF_3)_2PN]_n$ was thus obtained. Other compounds having the same elemental composition but different structure and characteristics have been isolated from this reaction and are described and claimed in copending application Serial No. 122,353, filed July 6, 1961, for Trimeric and Tetrameric Bis(Trifluoromethyl)Phosphinic Nitrides.

Another example of synthesis performed through the procedure of the present invention is the preparation of trimeric bis(heptafluoropropyl) phosphinic nitride, $[C_3F_7)_2PN]_3$ which was obtained in a 70% yield employing the same procedure as previously described herein, starting from bis(heptafluoropropyl) phosphinous amide, $(C_3F_7)_2PNH_2$. This compound is described and claimed in another copending application, Serial No. 122,354, filed July 6, 1961, for Trimeric Bis(heptafluoropropyl)Phosphinic Nitride.

The whole operation of the present synthesis is greatly more convenient and practical than the technique of the decomposition of the azide, and provides entirely safe reactions and yields of high pure grade compound.

Obviously many modifications and variations of the present invention are possible in the light of the above teachings. It is therefore to be understood that within the scope of the appended claims the invention may be practiced otherwise than as specifically described.

What is claimed is:
1. A method for the synthesis of bis(trifluoromethyl and heptafluoropropyl)phosphinic nitrides which comprises reacting a chloroform solution of bis(perfluoroalkyl)phosphinous amide of the formula $(R_F)_2PNH_2$, where $R_F$ is from the group consisting of trifluoromethyl and heptafluoropropyl, with chlorine at a temperature of $-30°$ C. in an inert atmosphere and subsequent dehydrohalogenation of the reaction mixture with trimethylamine.
2. A method for the synthesis of bis(trifluoromethyl)-phosphinic nitride which comprises reacting a chloroform solution of bis(trifluoromethyl)phosphinous with chlorine in an inert atmosphere at a temperature of $-30°$ C. and the subsequent dehydrohalogenation of the reaction mixture with a trimethylamine.
3. A method for the synthesis of bis(heptafluoropropyl)phosphinic nitride comprising reacting a chloroform solution of bis(heptafluoropropyl)phosphinous amide with chlorine in an inert atmosphere at a temperature of $-30°$ C. and the subsequent dehydrohalogenation of the reaction mixture with trimethylamine.

References Cited in the file of this patent

Audrieth et al. Chemical Reviews, volume 32, pages 125–130 (1940).
Harris: J. Chem. Soc. (London), pages 512–519 (1958).